(12) United States Patent
Reese et al.

(10) Patent No.: US 9,544,221 B2
(45) Date of Patent: *Jan. 10, 2017

(54) TEMPERATURE SENSITIVE ROUTING OF DATA IN A COMPUTER SYSTEM

(71) Applicant: International Business Machines Corporation, Armonk, NY (US)

(72) Inventors: Brett J. Reese, Byron, MN (US); Gary R. Ricard, Chatfield, MN (US); Jaimeson J. Saley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,041

(22) Filed: Apr. 16, 2014

(65) Prior Publication Data

US 2015/0100681 A1    Apr. 9, 2015

Related U.S. Application Data

(63) Continuation of application No. 14/045,032, filed on Oct. 3, 2013.

(51) Int. Cl.
*H04L 12/703* (2013.01)
*H04L 12/803* (2013.01)
(Continued)

(52) U.S. Cl.
CPC ............ *H04L 45/14* (2013.01); *H04L 43/08* (2013.01); *H04L 43/0817* (2013.01); *H04L 45/12* (2013.01); *H04L 45/28* (2013.01)

(58) Field of Classification Search
CPC .......... H04L 43/00; H04L 45/22; H04L 45/00; H04L 45/14; H04L 45/24; H04L 45/28; H04L 47/25; H04L 47/29; H04L 47/32; H04L 47/122; H04L 47/125; G06F 1/206
See application file for complete search history.

(56) References Cited

U.S. PATENT DOCUMENTS 6,836,800 B1 * 12/2004 Sweet et al. .................. 709/224
7,248,560 B1    7/2007 Blankenship et al.
(Continued)

FOREIGN PATENT DOCUMENTS

KR    1020090117257 A    11/2009

OTHER PUBLICATIONS

Shang et al., "Thermal modeling, characterization and management of on-chip networks," in Proc. IEEE/ACM International Symposium on Microarchitecture (Micro '04), Dec. 2004, pp. 67 78.*

(Continued)

*Primary Examiner* — Scott M Sciacca
(74) *Attorney, Agent, or Firm* — Martin & Associates, LLC; Bret J. Petersen

(57) ABSTRACT

An apparatus and method routes data over network links based on a temperature of the network links. When the temperature of a link meets a first threshold a routing mechanism re-routes a portion of the network traffic over a lower temperature link to reduce the likelihood that the link will exceed a second threshold that necessitates that the link be throttled back or disabled. Re-routing data to cooler links allows the system to maintain the lowest possible temperature of the network links to gain optimal performance of the system. In the disclosed example, the network links include interconnect cable connections and backplane connections. A temperature of the network links is determined by monitoring a region of an integrated circuit near a line driver driving the network link.

12 Claims, 6 Drawing Sheets

(51) Int. Cl.
*H04L 12/721* (2013.01)
*H04L 12/26* (2006.01)

(56) References Cited

U.S. PATENT DOCUMENTS

| | | | |
|---|---|---|---|
| 2003/0110423 A1* | 6/2003 | Helms et al. | 714/100 |
| 2006/0193250 A1 | 8/2006 | Desjardins et al. | |
| 2009/0182986 A1* | 7/2009 | Schwinn | G06F 1/206 |
| | | | 712/214 |
| 2012/0195195 A1* | 8/2012 | Rai | H04L 45/125 |
| | | | 370/235 |
| 2013/0003559 A1* | 1/2013 | Matthews | H04L 43/0876 |
| | | | 370/241 |
| 2013/0076381 A1* | 3/2013 | Takayanagi | G01K 3/005 |
| | | | 324/750.03 |
| 2013/0188640 A1 | 7/2013 | Cors et al. | |
| 2013/0322255 A1* | 12/2013 | Dillon | 370/236 |
| 2014/0201550 A1* | 7/2014 | Rusu | 713/322 |
| 2015/0036536 A1* | 2/2015 | Kumar | H04L 41/12 |
| | | | 370/254 |

OTHER PUBLICATIONS

Chao et al., "Traffic- and Thermal-Aware Run-Time Thermal Management Scheme for 3D NoC Systems," 2010 Fourth ACM/IEEE International Symposium on Networks-on-Chip, IEEE Computer Society, 2010.

\* cited by examiner

TEMPERATURE SENSITIVE ROUTING OF DATA IN A COMPUTER SYSTEM

BACKGROUND

1. Technical Field

This invention generally relates to data communication in computer systems, and more specifically relates to routing data traffic on other network links having a lower temperature when the temperature of a network link exceeds a threshold.

2. Background Art

Supercomputers and other multi-node computer systems continue to be developed to tackle sophisticated computing jobs. Multi-node computer systems often use multiple compute nodes coupled together in a common chassis. In one example, the computers or compute nodes are separate servers that are coupled by a common backbone within the chassis. In such systems, each server or compute node is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis.

Multi-node computer systems sometime incorporate multiple network links to connect the compute nodes or servers of the system. The temperature of the network link is proportional to the workload of the link. The performance of the network link is dependent on temperature. So as the temperature rises, the network link may experience increased loss of data packets in the data communication over the network link.

BRIEF SUMMARY

An apparatus and method routes data over network links based on temperature of the network links. When the temperature of a network link meets a first threshold a routing mechanism re-routes a portion of the network traffic over a lower temperature network link to reduce the likelihood that the network link will exceed a second threshold that necessitates that the network link be throttled back or disabled. Re-routing data to cooler network links allows the system to maintain the lowest possible temperature of the network links to gain optimal performance of the system. In the disclosed example, the network links include interconnect cable connections and backplane connections. A temperature of the network links is determined by monitoring a region of an integrated circuit near a line driver driving the network link.

The foregoing and other features and advantages of the invention will be apparent from the following more particular description below, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide mechanisms and methods for routing data over data network links based on temperature of the network links. When the temperature of a network link meets a first threshold a routing mechanism re-routes a portion of the network traffic over a lower temperature network link to reduce the likelihood that the network link will exceed a second threshold that necessitates that the network link be throttled back or disabled. Re-routing data to cooler network links allows the system to maintain the lowest possible temperature of the network links to gain optimal performance of the system. In the disclosed example, the network links include interconnect cable connections and backplane connections. An approximate temperature of the network links is determined by monitoring a region of an integrated circuit near a line driver driving the network link. Re-routing data to cooler network links allows the system to maintain the lowest possible overall temperature to gain optimal performance of the system.

Figure 1:
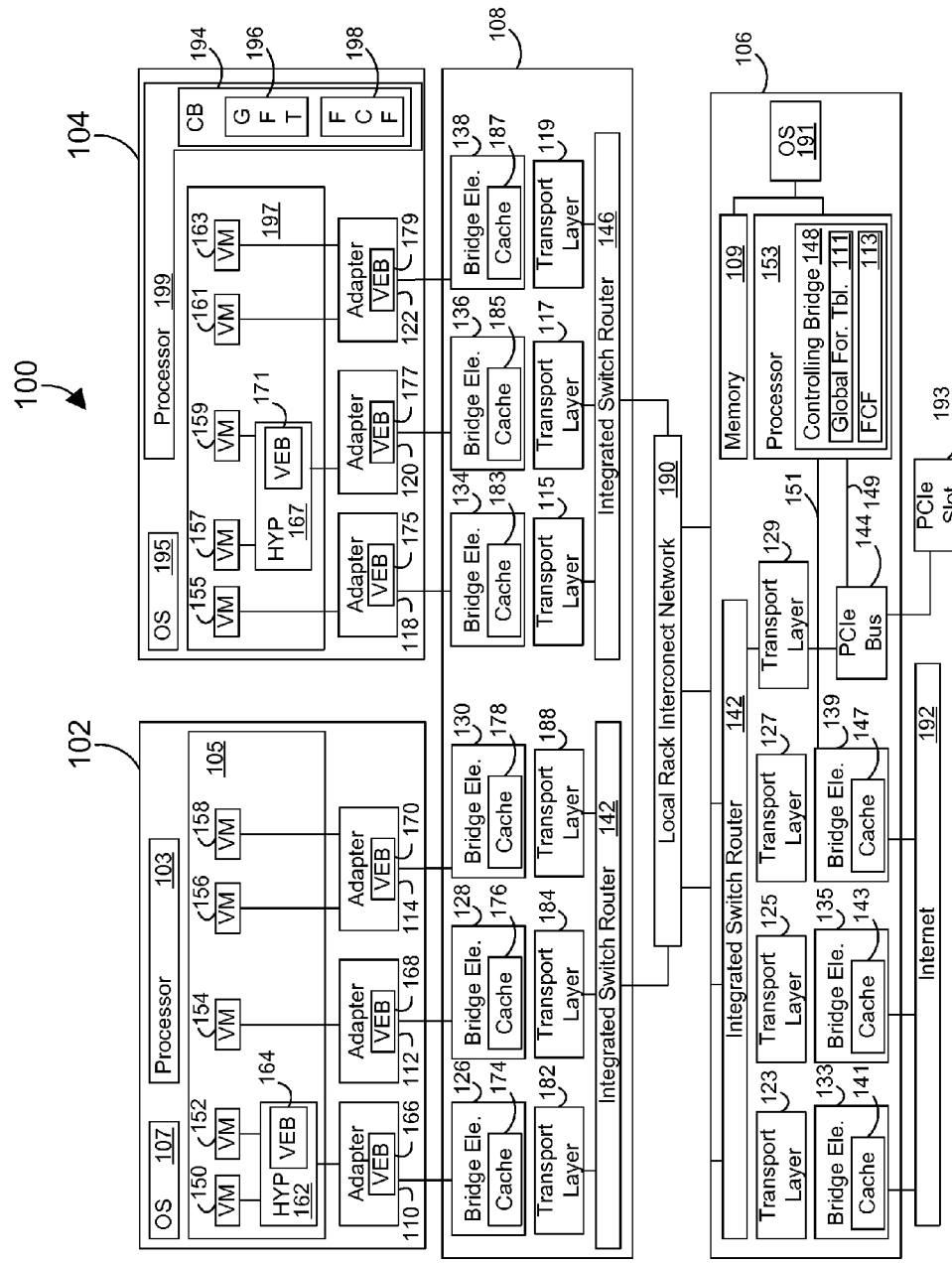
FIG. 1 is a block diagram of a prior art system that uses distributed bridge elements to route data over a multiple network links.

FIG. 1 illustrates a highly integrated system 100 configured to conduct register access operations using a plurality of distributed bridge elements and one or more controlling bridges according to the prior art. FIG. 1 generally shows a computer system 100 configured to forward data frames using a distributed virtual bridge 108. The distributed virtual bridge 108 may selectively forward data frames having access register requests to distributed bridge elements and other target nodes. The system 100 includes a first server computer 102 and a second server computer 104 that are both coupled to an I/O blade device 106 via the distributed virtual bridge 108. The server computers 102, 104 and the I/O blade device 106 may be housed within separate chassis and racks. The distributed virtual bridge 108 may be coupled to multiple adapters 110, 112, 114, 118, 120 and 122. The adapters 110, 112, 114, 118, 120 and 122 may be located within or may be coupled to the server computers 102, 104. The distributed virtual bridge 108 may use multiple access points, or bridge elements 126, 128, 130, 134, 136 and 138 to couple to the server computers 102, 104. For example, a microchip that includes the bridge elements 126, 128, and 130 may be cabled or otherwise coupled to a port of the server computer 102 that includes the adapter 110. As explained herein, the distributed virtual bridge 108 may functionally supplant chassis switches and top of rack switches with a frame-based network fabric that functions in a similar fashion to an Ethernet network.

One or more transport layer modules 182, 184 and 188 coupled to the bridge elements 126, 128, and 130 may provide a frame-based. Ethernet-like interface to one or more integrated switch routers 142. The transport layer module 182 may be configured to deconstruct a transmission of data frames so that packet information may be evenly distributed across links to a local rack interconnect network 190. The data frames may not be serialized upon leaving the transport layer module 182. A receiving transport layer module 123 may serialize the data frames to achieve reliable, in-order delivery. If the receiving transport layer module 123 determines that data frame information is missing, the transport layer module 123 may initiate a process to recover the missing data. The translation process may be accomplished in hardware, which may provide a larger bandwidth and faster processing than software applications. The transport layer modules 182, 184, and 188, the integrated switch router 142, and the local rack interconnect network 190 may combine to include an underlying lossless, point-to-point communication network (i.e., an integrated switch router network) between the server computers 102, 104 and the I/O blade device 106.

The bridge elements 126, 128 and 130 may function as data link layer (i.e., Layer 2) bridge forwarders within the distributed virtual bridge 108. In particular embodiments, the bridge elements 126, 128, and 130 may comprise a switch, or router device. The bridge elements 126, 128 and 130 may include learned (e.g., received and stored) cached address data used to forward data frames throughout the distributed virtual bridge 108. The learned address data may correspond to one or both of a destination address and a source address associated with a data frame. When the bridge element 126 does not include address data pertinent to a source or destination address of a received data frame, the bridge element 126 may query a controlling bridge 148 for the address data. The controlling bridge 148 may include a global forwarding table 111 that includes stored address data. The stored address data may be continuously updated by the bridge elements 126, 128 and 130. For example, a bridge element 126 may send an update message to the controlling bridge 148 in response to learning an updated or new MAC address. A corresponding MAC address in the global forwarding table 111 may be subsequently updated. Conversely, the address data of the global forwarding table 111 may be used to update the bridge elements 126, 128 and 130. For example, the controlling bridge 148 may respond to a query from the bridge element 126 with requested address data. The bridge element 126 may cache the received address data for future use.

The first server computer 102 may include one or more virtual machines (VMs) 150, 152, 154, 156, and 158. A virtual machine may include a software implementation of a computer and may execute programs in a manner similar to a physical machine. FIG. 1 shows an illustrative hypervisor 162 that is coupled to both the virtual machine 150 and the virtual machine 152. The hypervisor 162 may include platform virtualization software that allows multiple operating systems to run concurrently on the first server computer 102. The hypervisor 162 may include a hypervisor virtual bridge 164 that allows direct communication between the virtual machines 150, 152 without traversal of an external network. In one embodiment, the hypervisor virtual bridge 164 may register address information with the controlling bridge 148.

The server computer 102 may include at least one processor 103 coupled to a memory 105. The processor 103 may represent one or more processors (e.g., microprocessors), and the memory 105 may represent random access memory (RAM) devices comprising the main storage of the server computer 102, as well as supplemental levels of memory, e.g., cache memories, non-volatile or backup memories (e.g., programmable or flash memories), read-only memories, etc. In addition, the memory 105 may be considered to include memory storage physically located in the server computer 102 or on another server computer 104 coupled to the server computer 102 via the distributed virtual bridge 108. The first server computer 102 may operate under the control of an operating system (OS) 107 and may execute or otherwise rely upon various computer software applications, components, programs, objects, modules, and data structures, such as the virtual machines 150, 152, 154, 156, and 158. Moreover, various applications, components, programs, objects, modules, etc. may also execute on one or more processors in another device coupled to the server computer 102 (e.g., in a distributed computing environment, where computing processes may be allocated to multiple server computers). The first server computer 102 may include the adapters 110, 112 and 114, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 110, 112 and 114 may be used to implement a Fiber Channel over Ethernet (FCoE) protocol. Each adapter 110, 112 and 114 may be coupled to one or more of the virtual machines 150, 152, 154, 156 and 158. The adapters 110, 112 and 114 may facilitate shared access of the virtual machines 150, 152, 154, 156 and 158. While the adapters 110, 112, and 114 are shown in FIG. 1 as being included within the server computer 102, adapters of another embodiment may include physically distinct devices that are separate from the server computers 102, 104.

Each adapter 110, 112, and 114 may include a converged adapter virtual bridge 166, 168 and 170. The converged adapter virtual bridges 166, 168 and 170 may facilitate sharing of the adapters 110, 112, and 114 by coordinating access by the virtual machines 150, 152, 154, 156 and 158. Each converged adapter virtual bridge 166, 168, and 170 may recognize data flows included within its domain. A recognized domain address may be routed directly, without processing or storage outside of the domain of the particular converged adapter virtual bridge 166, 168 and 170. Each adapter 110, 112 and 114 may include one or more CEE transmit ports that couple to one of the bridge elements 126, 128, and 130. In another embodiment, bridge elements may be co-located with the adapters, and coupling between adapters and the bridge elements may not be Ethernet connections. The bridge elements 126, 128 and 130 may be configured to forward data frames throughout the distributed virtual bridge 108. The bridge elements 126, 128 and 130 may thus function as access points for the distributed virtual bridge 108 by translating between Ethernet and the integrated switch router 142. The bridge elements 126, 128 and 130 may not include buffers and may support CEE at boundaries of the distributed virtual bridge 108. In another embodiment, the bridge elements 126, 128 and 130 may include buffers. Each bridge element 126, 128 and 130 of the distributed virtual bridge 108 may include a forwarding cache 174, 176 and 178. A forwarding cache 174, 176 and 178 may include a lookup table that stores address data used to forward data frames that are received by the bridge elements 126, 128 and 130. For example, the bridge element 126 may compare address data associated with a received data frame to the address data stored within the forwarding cache 174.

Illustrative address data may include routing information, such as a muting key included within header data of the data frame. The routing key may include at least one of a virtual local area network (VLAN) tag and a logical network identifier, as well as a MAC address. The MAC address may be generated and assigned by a Fiber Channel Forwarder (FCF) 113, as set by an administrator or computing system. The Fiber Channel Forwarder 113, or FCoE switch, may facilitate connectivity between FCoE initiators and Fiber Channel fabrics. To illustrate, an FCoE data frame sent from the first virtual machine 158 and intended for a second virtual machine 163 may be addressed to the Fiber Channel Forwarder 113 in accordance with the FCoE standard. According to standard routing procedures, the Fiber Channel Forwarder 113 may receive and readdress the FCoE data frame for forwarding to the virtual machine 163. The Media Access Control (MAC) address of the Fiber Channel Forwarder 113 may have been learned by the first server computer 102 during a discovery phase, when the Fiber Channel Forwarder 113 establishes communications with networked devices. During the discovery phase, the second server computer 104 may respond to broadcast queries from the first server computer 102. The Fiber Channel Forwarder 113 may discover the second server computer 104 from the query responses. After the discovery phase, a login phase may be initiated. A MAC address of the server computer 104 may be reassigned by the Fiber Channel Forwarder 113. The reassigned MAC address may be used for subsequent routing and communications between the server computers 102, 104. The Fiber Channel Forwarder 113 may facilitate storage of MAC addresses assigned to the server computers 102, 104.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth. A logical network may include a logically specified network portion of the distributed virtual bridge 108. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 174, 176, and 178 of the distributed virtual bridge 108 may have a format similar to the global forwarding table 111 of the controlling bridge 148. The forwarding caches 174, 176 and 178 may have smaller memory capacities than the global forwarding table 111. The forwarding caches 174, 176 and 178 may further be updated with address data learned from data frames that flow through the bridge elements 126, 128 and 130. The address data may additionally be updated with address data received from the global forwarding table 111. Invalid or changed address data that is updated within one or more of the forwarding caches 174, 176 and 178 of the bridge elements 126, 128 and 130 may be communicated to the global forwarding table 111 of the controlling bridge 148. For example, the bridge element 126 may learn a new MAC address of a newly added device that is configured to receive from or send data to the distributed virtual bridge 108. The bridge element 126 may verify that a source MAC address included within a received data frame is allowed at a port by checking a list stored within a memory. The bridge element 126 may send a registration message to the controlling bridge 148 to update the global forwarding table 111 with the verified MAC address. The bridge element 126 may further store the MAC address within the forwarding cache 174. In another example, the bridge element 126 may identify a MAC address that is infrequently used. This infrequently used MAC address may be removed from the forwarding cache 174 to make storage room available for other MAC addresses. The bridge element 126 may send an update message to the controlling bridge 148 to have the MAC address removed from the global forwarding table 111.

Address data stored within the global forwarding table 111 may be communicated to one or more forwarding caches 174, 176 and 178 of the distributed virtual bridge 108. For example, the bridge element 126 may receive a data frame that includes a destination MAC address that is not stored within the forwarding cache 174. To obtain information for forwarding the data frame, the bridge element 126 may send a query to a bridge element 139 configured to access the controlling bridge 148. The bridge element 139 may search the global forwarding table 111 for address data associated with the destination MAC address. If the address data is found, the bridge element 139 may forward the MAC address through the distributed virtual bridge 108 to the querying bridge element 126. The bridge element 126 may store the MAC address as address data within the forwarding cache 174. As with the global forwarding table 111, the address data included within the forwarding caches 174, 176 and 178 of the distributed virtual bridge 108 may include both internal address information, as well as addresses that are external to the system 100. Each of the bridge elements 126, 128 and 130 may be connected to one or more of the transport layer modules 182, 184 and 188. The transport layer modules 182, 184 and 188 may include buffering used for attachment to the integrated switch router 142. The transport layer modules 182, 184 and 188 may further provide a frame-based, Ethernet-like interface to the integrated switch router 142.

The transport layer modules 182, 184 and 188 may each include a shared buffer used to transmit frames across the integrated switch router 142. Additional buffers of the transport layer modules 182, 184, and 188 may be used to receive data frames from the integrated switch router 142. The buffers may be divided into different virtual lanes. Virtual lanes may include logically separated paths for data frame traffic flowing between a bridge element and a transport layer module. For example, there may be four virtual lanes between the bridge element 126 and the transport layer module 182. The transport layer modules 182, 184 and 188 may include logic to recover from faulty microchips and links between a source and a destination. The transport layer modules 182, 184 and 188 may maintain a strict ordering of packets within a particular virtual lane regardless of each data frame's path through the local rack interconnect network 190 and the computer system 100.

The integrated switch router 142 may communicate with the transport layer modules 182, 184 and 188 and may facilitate routing and packet delivery to and from the local rack interconnect network 190. The local rack interconnect network 190 may include links to the bridge elements 126, 128 and 130 located within the same chassis and rack, as well as links to the bridge elements 134, 136 and 138 in different chassis and racks. The local rack interconnect network 190 may include point-to-point connections, or pipes, between the bridge elements 126, 128, 130 and 134, 136, 138 of the distributed virtual bridge 108 with no frame loss and with in-order frame delivery. The second server computer 104 may be similar to the first server computer 102. The second server computer 104 may be located within a different chassis and rack than the first server computer 102. Similar to the first server computer 102, the second server computer 104 may include a processor 199 coupled to a memory 197 and to an operating system 195. The processor 199 may include a controlling bridge (CB) 194, a global forwarding table (GFT) 196, and a fiber channel forwarder (FCF) 198. The second server computer 104 may further include virtual machines 155, 157, 159, 161 and 163.

A hypervisor 167 may be coupled to the virtual machines 157, 159. The hypervisor 167 may include a hypervisor virtual bridge 171 that allows direct communication between the virtual machines 157, 159. For example, the hypervisor virtual bridge 171 may register address data with the controlling bridge 148. The second server computer 104 may also include one or more adapters 118, 120 and 122, such as converged CEE network adapters. Each adapter 118, 120 and 122 may be coupled to one or more of the virtual machines 155, 157, 159, 161 and 163. The adapters 118, 120 and 122 may each include a converged adapter virtual bridge 175, 177 and 179. The converged adapter virtual bridges 175, 177 and 179 may facilitate sharing of the adapters 118, 120 and 122 by coordinating virtual machine access. The adapters 118, 120 and 122 may each couple to one or more of the bridge elements 134, 136 and 138 of the distributed virtual bridge 108. Each adapter 118, 120 and 122 may include one or more CEE transmit ports that couple to one of the bridge elements 134, 136, or 138. Each bridge element 134, 136 and 138 may include a forwarding cache 183, 185 and 187 that includes address data used to forward data frames that are received by the bridge elements 134, 136 and 138. The bridge elements 134, 136 and 138 may each be connected to one or more transport layer modules 115, 117 and 119. The transport layer modules 115, 117 and 119 may include buffering used for the attachment to the integrated switch router 146. The transport layer modules 115, 117 and 119 may further provide a frame-based, Ethernet-like interface to the integrated switch router 146 and may maintain packet ordering. A portion of the distributed virtual bridge 108 shown in FIG. 1 as located above the local rack interconnect network 190 and as associated with the server computers 102, 104 may be referred to as a north portion. The bridge elements 126, 128, 130, 134, 136 and 138 may be coupled to the adapters 110, 112, 114, 118, 120 and 122.

The I/O blade device 106 may be an I/O server computer. As such, the I/O blade device 106 may allow uplink connectivity to an external Ethernet network 192 via an integrated switch router 142 that is coupled to transport layer modules 123, 125, 127 and 129. The transport layer modules 123, 125, 127 and 129 may each couple to a bridge element 133, 135 and 139. The bridge elements 133, 135, 137, and 139 may each include a forwarding cache 141, 143 and 147. The I/O blade device 106 may be categorized as being included within a south portion of the distributed virtual bridge 108 because the bridge elements 133, 135, and 139 may be coupled to an uplink to the Internet 192. The I/O blade device 106 may include a memory 109, an operating system 191, and a processor 153 that includes the controlling bridge 148. The bridge element 139 may be coupled to the processor 153 via an Ethernet link connection 151. The transport layer module 129 may be coupled to a PCIe bus 144 that is coupled via a PCIe link connection 149 to the processor 153 and the controlling bridge 148. The PCIe bus 144 may also be coupled to a PCIe slot 193.

The controlling bridge 148 may communicate with the bridge elements 126, 128, 130, 134, 136 and 138 and other controlling bridges (not shown) of the computer system 100. The controlling bridge 148 may include firmware executing on the processor 153 that manages the bridge elements 126, 128, 130, 134, 136 and 138. For example, the controlling bridge 148 may be configured to divide a workload between the bridge elements 126, 128, 130, 134, 136 and 138, as well as perform synchronization procedures and failover operations. The controlling bridges 148, 194 may be configured to interface with and program the bridge elements 126, 128, 130, 134, 136 and 138. More particularly, the controlling bridges 148 and 194 may be configured to generate and send a data frame to one or more of the bridge elements 126, 128, 130, 134, 136 and 138. The data frames may include register access requests used by the bridge elements 126, 128, 130, 134, 136 and 138 to access registers.

The controlling bridge 148 may include the Fiber Channel Forwarder 113. FCoE may offer the capability to transport fiber channel payloads on top of an Ethernet network. The Fiber Channel Forwarder 113 may execute the Fiber Channel Initialization Protocol to discover and initialize FCoE capable entities connected to an Ethernet cloud. The Fiber Channel Forwarder 113 may further include firmware that encapsulates and de-encapsulates Fiber Channel data frames (e.g., FCoE formatted data frames). In at least one embodiment, the Fiber Channel Forwarder 113 may translate between Ethernet and Fiber Channel protocols. The controlling bridge 148 may additionally include the global forwarding table 111. The global forwarding table 111 may include address data (e.g., MAC addresses) that is registered and maintained through communication and cooperation with the bridge elements 126, 128, 130, 134, 136 and 138, and in some cases, the hypervisors 162 and 167.

In one example, the global forwarding table 111 may maintain MAC addresses that have been learned by a bridge element 126. The bridge element 126 may register the address data with the controlling bridge 148. The controlling bridge 148 may update the global forwarding table 111 by adding the address data to the global forwarding table 111. Similarly, the bridge element 126 may cause the controlling bridge 148 to update the global forwarding table 111 by sending an update message to the controlling bridge 148. The update message may cause the controlling bridge 148 to delete a MAC address that has been aged out by the bridge element 126. A MAC address may further be deleted when the bridge element 126 has detected that the address data is no longer valid.

In another example, the hypervisor virtual bridge 164 may register MAC addresses or other address data with the controlling bridge 148. The global forwarding table 111 may include address data associated with addresses that are included within the system 100, as well as addresses that are external to the system 100. The controlling bridge 194 with its corresponding global forwarding table 196 and fiber channel forwarder 198 performs similar functions as controller bridge 418 discussed above.

FIG. 1 thus shows an embodiment of a system 100 that includes a distributed virtual bridge 108 configured for lossless, point-to-point, in-order data frame delivery. The system 100 may support Fiber channel over Ethernet (FCoE) and may be scalable to include hundreds or more server computers. The controlling bridges 148, 194 may be configured to interface with and program registers of the bridge elements 126, 128, 130, 134, 136, 138 and the adapters 166, 168, 170, 175, 177, 179 to reduce administrator workloads. The automated register accesses may reduce potential bottlenecks and facilitate efficient processing.

Figure 2:
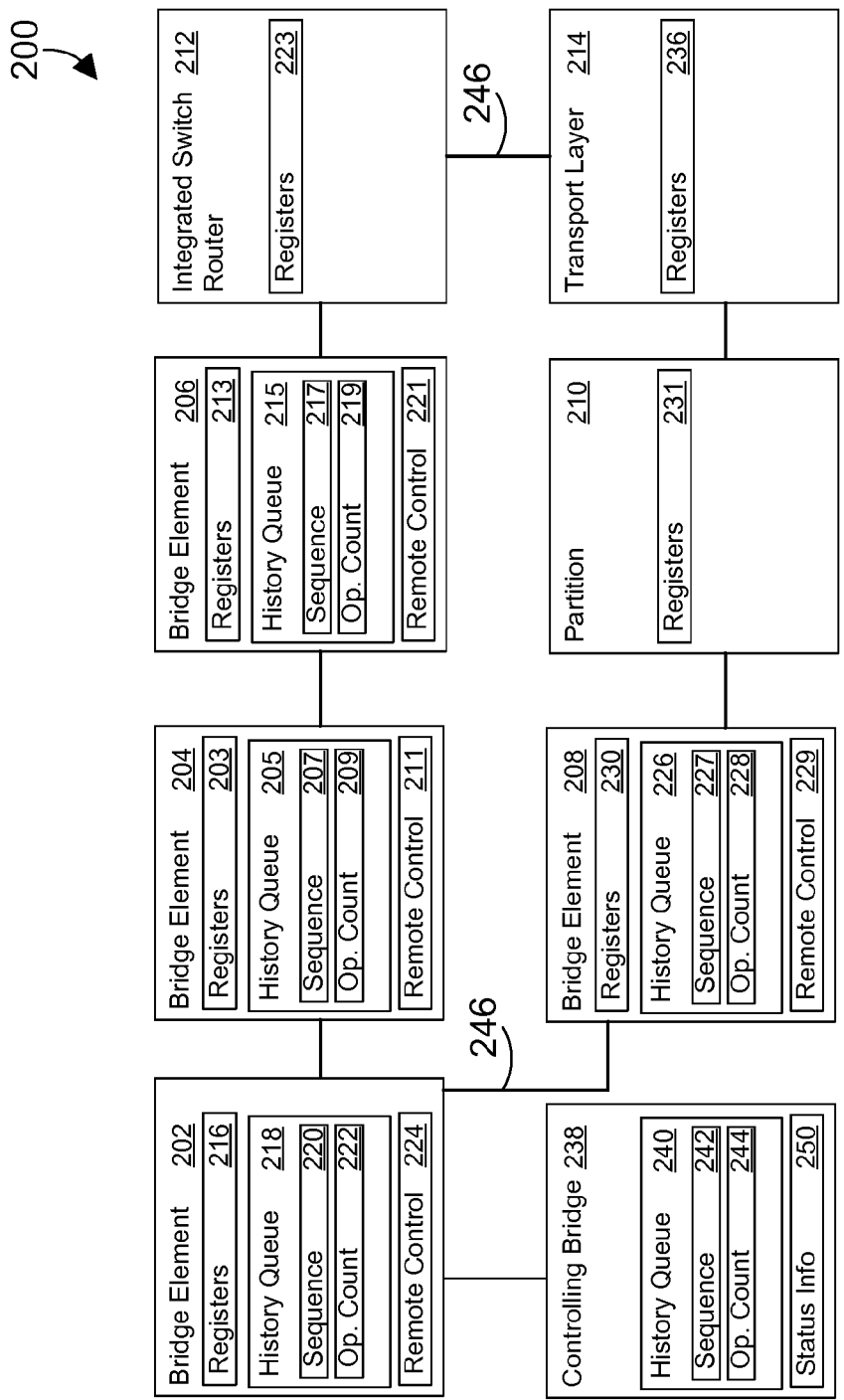
FIG. 2 is a block diagram of another prior art system that uses distributed bridge elements to route data over a multiple network links.

FIG. 2 illustrates another particular embodiment of a prior art system 200 configured to conduct register access operations using a plurality of distributed bridge elements 202, 204, 206, 208 and one or more controlling bridges 238. The controlling bridge(s) 238 may be connected by an Ethernet network interface controller (NIC) directly or indirectly through a Local Rack Interconnect, such as the Local Rack Interconnect Network 190 of FIG. 1. A main register ring 246 may include a communications path that uses a register ring protocol to connect nodes on a microchip. For example, the main register ring 246 may be coupled to the bridge elements 202, 204, 206, 208, a partition 210, an integrated switch router 212, and a transport layer module 214. The bridge elements 202, 204, 206, 208 may include low latency, high speed switches that are similar to the bridge elements 126, 128, 130, 134, 136, 138 of FIG. 1. The partition 210 may include a defined storage area that includes registers 231. The integrated switch router 212 may include registers 223 and may be similar to the integrated switch routers 142, 146 of FIG. 1. The transport layer module 214 may include registers 236 and may be similar to the transport layer modules 115, 117, 119, 123, 125, 127, 129, 182, 184, 188 of FIG. 1.

On the main register ring 246, some of the nodes may be both initiators and targets with regard to register access requests. For example, the bridge elements 202, 204, 206, 208 may be configured to both initiate and receive a register access request. Other nodes, such as the partition 210, the integrated switch muter 212, and the transport layer module 214, may only receive register access requests. When making a register access request to another bridge element 202, 206, 208, the bridge element 204 may wait for a token on the main register ring 246. Once the token is received, the bridge element 204 may place the register access request on the main register ring 246. The receiving, or target, bridge element 206 to which the register access request is addressed may execute the register access request and communicate a response to the bridge element 204. The bridge element 204 may then return the token to the main register ring 246. To prevent conflicting register access operations from multiple controlling bridges, the controlling bridge 238 may select a bridge element 206 to be a bridge element control port. The bridge element control port may be used when accessing the registers 223, 231, 236 other than bridge element registers 203, 213, 216, 230.

Each bridge element 202, 204, 206, 208 may directly access its own local registers 216, 203, 213, and 230, respectively to facilitate parallel access by the controlling bridge 238. The access may occur without a token received from the main register ring 246. A bridge element may delay operations from the main register ring 246 until the register access requests have been completed. Each bridge element may comprise a local bridge element coupled to the controlling bridge 238. Each bridge element may be similar to the bridge element 139 of FIG. 1. The bridge element 202 may include the registers 216, a history queue 218, and a remote control module 224. The history queue 218 may include FIFO entries that include sequence numbers 220. The sequence numbers 220 may correspond to data frames having register access requests. An operations count 222 may correspond to a number of successfully completed register access requests associated with a data frame. While only one history queue 218 is shown as being included in the bridge element 202, an embodiment of another bridge element may include multiple history queues (e.g., a history queue for each controlling bridge that may control the bridge element). The remote control module 224 may be configured to execute the register access requests, as well as to update the sequence numbers 220 and the operations count 222. The remote control module 224 may be configured to update operand fields of the data frame with request status information and to route data frames throughout the system 200.

The controlling bridge 238 may be directly coupled to the bridge element 202 via an Ethernet NIC or may be remotely coupled via a Local Rack Interconnect to communicate with the bridge elements 202, 204, 206, 208 using data frames that include register access requests. The controlling bridge 238 may use a semaphore mechanism to prevent other controlling bridges (not shown) from accessing a register 203, 213, 216, 223, 230, 231, 236 at the same time. The controlling bridge 238 may include a FIFO history queue 240 comprising sequence numbers 242 and operation counts 244. The sequence numbers 242 may be associated with respective data frames and their associated register access requests. The sequence numbers 242 may be unique. The operation counts 244 may be compared to operation counts 209, 219, 222, 228 stored in the bridge elements 202, 204, 206, 208 to determine a status of a register access request.

The controlling bridge 238 may additionally include status information 250 that is associated with register access requests. For example, the controlling bridge 238 may access the status information 250 to set an entry associated with a first register access request to "pending." The status information 250 may be set prior to sending a data frame along with the register access request. When an error is detected, the status information 250 may be updated to reflect details of the detected error. Entries associated with other register access request may be pending until the first register access request has been successfully completed. Illustrative status information may include: pending, completed, not completed with lock conflict, and error (e.g., access timeout, frame too short, and frame too long). The controlling bridge 238 may insert a four byte sequence number within a field of a data frame. The sequence number field may be unchanged by a receiving bridge element 204 that uses the sequence number field to update the sequence numbers 207. The bridge element 204 may return the data frame and associated sequence number to the controlling bridge 238. The controlling bridge 238 may check the sequence number of the returned data frame against the stored sequence numbers 242 to confirm delivery or to detect a loss of a data frame.

The controlling bridge 238 may access the history queue 215 when a data frame having an expected sequence number is not received at the controlling bridge 238 from the bridge element 206. The controlling bridge 238 may determine by reading the history queue 215 if the data frame having the sequence number was received by the bridge element 206. If the data frame was never received, the controlling bridge 238 may resend the data frame to the bridge element 206. If an entry in the history queue 215 indicates that the data frame was received at the bridge element 206, then the controlling bridge 238 may read the operations count 219 or the number of successfully completed operations. The operations count 219 may be used to determine whether an error was encountered while processing a register access request of the data frame at the bridge element 206.

A successfully completed operation may include a completed semaphore access. Each register access (i.e., a load or a store operation) of a set of sequential register accesses may be counted as a successfully completed operation. A register access that completes in error may not be counted as a successfully completed operation. A register access that includes a read on the main register ring 246 followed by a write to the main register ring 246 may be counted as a single successfully completed operation.

To prevent conflicting register access operations from multiple controlling bridges, the controlling bridge 238 may select a bridge element of the bridge elements 202, 204, 206, 208 to be a bridge element control port. The designated bridge element control port may be used when accessing registers other than bridge element registers. For instance, when a data frame is addressed to a non-bridge element (e.g., the partition 210, the integrated switch router 212, or the transport layer module 214), a bridge element 208 designated by the controlling bridge 238 as the bridge element control port may receive and route the data frame to the non-bridge element target node. The controlling bridge 248 may send data frames directly to the bridge elements 202, 204, 206, 208 (i.e., without use of a designated bridge element control port). For example, when the bridge element 206 is the target of the data frame (and included register access request), the remote control module 221 of the bridge element 206 may receive the data frame.

The bridge elements 204, 206, 208 may comprise north bridge elements, such as the north bridge element 126 of FIG. 1. The bridge element 204 may include registers 203, a history queue 205, and a remote control module 211. The history queue 205 may include FIFO entries that include sequence numbers 207. The sequence numbers 207 may correspond to data frames having register access requests. An operations count 209 may correspond to a number of successfully completed register access requests associated with a data frame. The remote control module 211 may be configured to execute the register access requests, as well as to update the sequence numbers 207, the operations count 209, and the operand fields of the data frame. The bridge element 206 may include the registers 213, the history queue 215, and a remote control module 221. The history queue 215 may include FIFO entries that include sequence numbers 217. The sequence numbers 217 may correspond to data frames having register access requests. An operations count 219 may correspond to a number of successfully completed register access requests associated with a data frame. The remote control module 221 may be configured to execute the register access requests, as well as to update the sequence numbers 217, the operations count 219, and the operand fields of the data frame.

The bridge element 208 may include the registers 230, a history queue 226, and a remote control module 229. The history queue 226 may include FIFO entries that include sequence numbers 227. The sequence numbers 227 may correspond to data frames having register access requests. An operations count 228 may correspond to a number of successfully completed register access requests associated with a data frame. The remote control module 229 may be configured to execute the register access requests, as well as to update the sequence numbers 227, the operations count 228, and the operand fields of the data frame.

FIG. 2 thus shows an example of a system 200 configured to enable a controlling bridge 238 to initiate register access requests using distributed bridge elements 202, 204, 206, and 208. The controlling bridge 238 may provide trusted (e.g., known and secure) firmware used to control access considerations, such as security, routing, and availability. The controlling bridge 238 may be configured to access registers of local and remote bridge elements 202, 204, 206, 208, as well as other hardware nodes 210, 212, 214. The automated register accesses may reduce potential bottlenecks and facilitate efficient processing.

Figure 3:
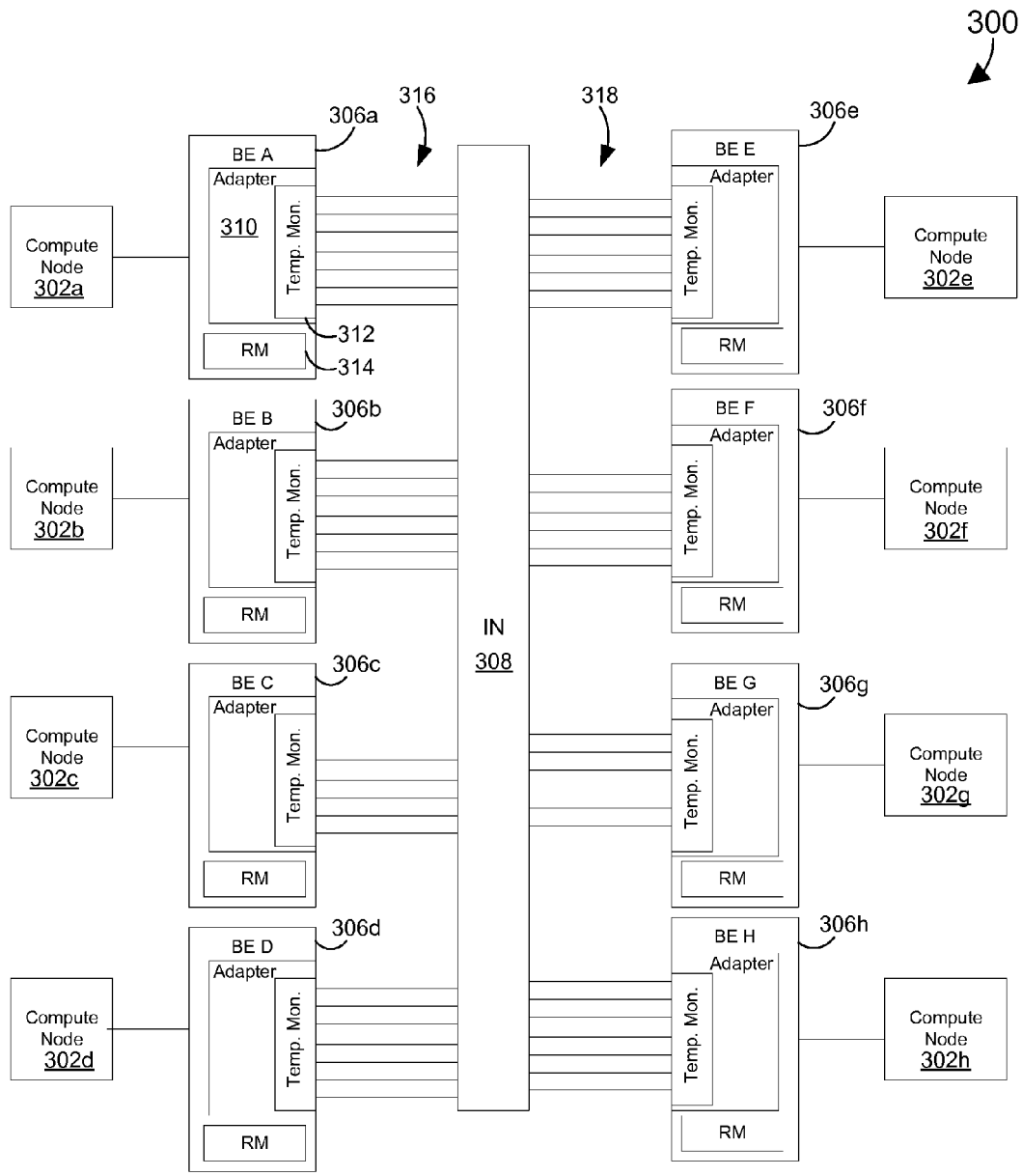
FIG. 3 is a block diagram that illustrates communication over the multiple network links for the systems in FIG. 1 and FIG. 2 with a routing mechanism that re-routes the data to cooler network links.

FIG. 3 is a block diagram that illustrates a communication system 300 for communication between compute nodes of a multi-node computer system where the compute nodes communicate over multiple network links to other compute nodes. The communication system 300 uses a routing mechanism that re-routes data to cooler network links as claimed herein. The communication system 300 described herein can be incorporated into the prior art computer systems shown in FIG. 1 (100) and FIG. 2 (200) with the additional features described herein below. The communication system 300 has a number of compute nodes 302 (302*a*-302*h*). These compute nodes 302 may be a stand-alone processor or other computing device. For example, the compute nodes 302 may represent the combination of the processors 103, 199 and virtual machines 150, 152, 154, 155 shown in FIG. 1. The compute nodes 302 may also comprise a computing resource at another location communicating over the internet 192 or a PCIe slot 193 shown in FIG. 1.

Again referring to FIG. 3, the compute nodes 302 communicate with each other through corresponding bridge elements 306 (306*a*-306*h*). The bridge elements 306 function as a network interface to connect the compute nodes to each other. For example, the bridge elements 306 are similar to the bridge elements 126, 128, 130, 134, 136, 138, 133, 135, 139 in FIG. 1 and their corresponding transport layer blocks 115, 117, 119, 123, 127, 129, 182, 184, 188. The bridge elements 306 are connected by network links that include an interconnect network (IN) 308 and network connections 316, 318. As an example, the IN 308 is similar to the local rack interconnect 190 in FIG. 1. In implementation, the IN 308 may be a single or multiple cables connecting the bridge elements, and the network connections 316, 318 may include board and backplane connections to the IN 308. Typically the cables of the IN 308 are the part of the interconnection that limits performance when they have a higher temperature, but the cables of the IN 308 and network connections 316, 318 are considered together herein as network links. Each bridge element connects with a number of connections to the IN 308. In this example, each bridge element 306 has seven network connections (shown at 316 and 318) that connect each bridge element to the other bridge elements through the IN 308. In other possible arrangements the bridge elements do not connect directly to all the other bridge elements, and any appropriate number of network links could be provided to interconnect the bridge elements.

The bridge elements 306 provide the function of a network interface for the compute nodes 302. All the functionality of the bridge elements known in the prior art will not be fully described here. The bridge elements will described with reference to bridge element 306*a*. The other bridge elements 306*b*-306*h* in this example are similar. The bridge element 306*a* includes a network adapter 310 with a temperature monitor block 312. While the network adapter 310 in this example is shown as a single block that is housed in a single chip or integrated circuit, it is understood herein that the network adapter may be implemented on one or more different chips. The temperature monitor block 312 monitors the temperature of regions of the network adapter chip that drive the network links to correlate the it to the temperature of the network links, including the network connections 316, 318 to other bridge elements 306 as described further below.

The bridge element 306*a* further includes a routing mechanism 314. The routing mechanism 314 obtains temperature data for the connections 316, 318 and determines how to adjust routing of the data communication as described herein. The routing mechanism may be hardware on the bridge element 306a or software. The routing mechanism may also be realized as software on the compute node 302a. The routing mechanism 306a may throttle or disable a network link when the temperature exceeds a first threshold, and may re-route traffic to another network link when the temperature exceeds a second threshold. The routing mechanism 306a also sets up the two thresholds for the routing. The routing mechanism can adjust the load of each network link to determine performance of the network link as a function of temperature while monitoring the temperatures of the network link. Using the acquired data, the routing mechanism can determine the desired temperatures for the two thresholds.

Figure 4:
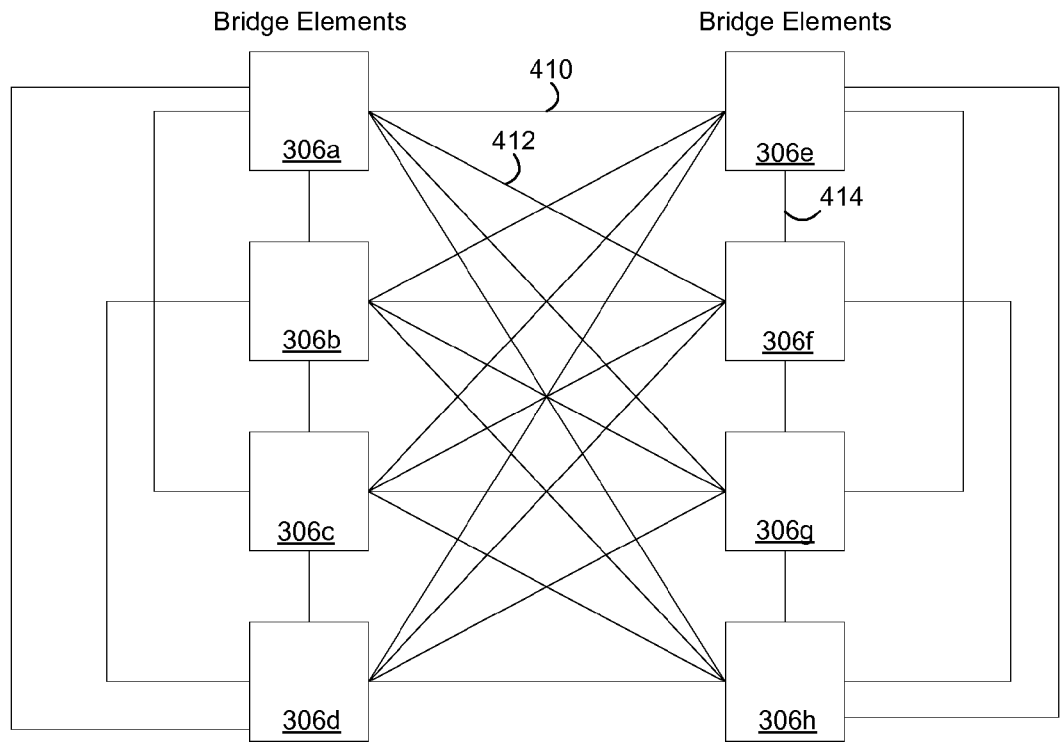
FIG. 4 is a block diagram that illustrates data communication paths through the multiple bridge elements and network links.
Figure 5:
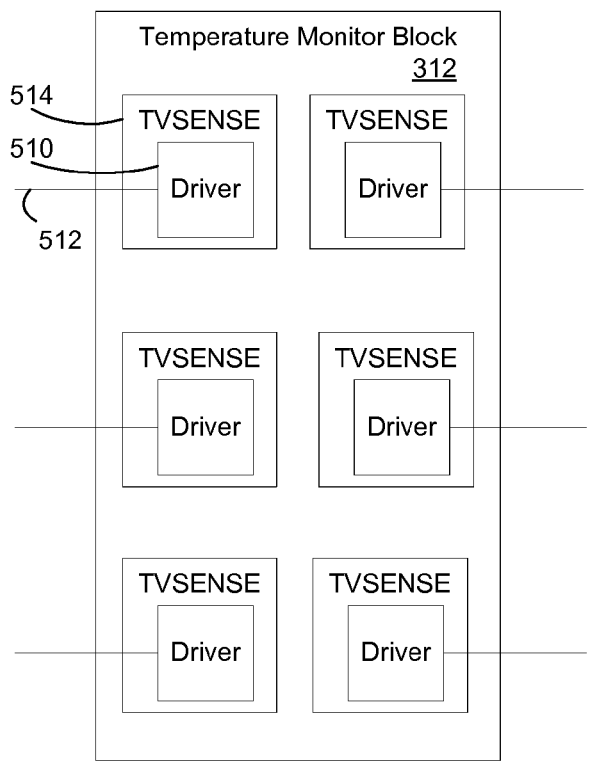
FIG. 5 is a block diagram that illustrates temperatures sensing in the network adapter in the bridge elements.

FIG. 4 is a block diagram to illustrate communication data flow between the bridge adapters through the multiple network links. In this example, each bridge adapter 306 connects to each of the other seven bridge adapters 306. The seven lines from each bridge adapter represent the interconnect lines 316, 318 and the interconnect network 308 in FIG. 3. Using these interconnects as shown, a compute node 302 (FIG. 3) connected to a bridge adapter 306 can send data message to any other compute node. Bridge adapters can communicate directly or indirectly through another bridge adapter. For example, bridge adapter 306a can communicate directly with bridge adapter 306e over a network link 410. Alternatively, bridge adapter 306a could communicate indirectly with bridge adapter 306f. In this case, the bridge adapter 306a would communicate over network link 412 with bridge adapter 306f and then the data would be forwarded to bridge adapter 306a over network link 414. The bridge adapters forward the data using routing tables as known in the prior art such as in the system shown in FIG. 1. In addition, the network links shown may also include multiple direct network links. For example, network link 410 could include two lines with two line drivers as shown in FIG. 5. When two direct network links are available, the routing mechanism can chose which direct network link to use based on temperature as described herein. While the illustrated example shows each bridge adapter connected to all the other bridge adapters, in some implementations the interconnect network may connect the bridge adapters to only a subset of the other bridge adapters.

As described above, the bridge elements 306 include an adapter chip 310. The adapter chip 310 includes a temperature monitor block 312 that monitors the temperatures for network links 316, 318 as shown in FIG. 3. FIG. 5 is a block diagram that illustrates temperatures sensing in the network adapter of the bridge elements. A line driver circuit 510 drives a connection 512 (one of the connections 316, 318 in FIG. 3). The temperature monitor block 312 includes a temperature voltage sense (TVSense) region 514 around or near the driver 510. The temperature sensing by the temperature voltage sense region 514 is done in a manner known in the prior art to sense the temperature of a region of an integrated circuit or "chip". The temperature of the TVSense region 514 is correlated to the temperature of the network link and the performance of the network link. The correlation may be done by empirical results during a test run or a production run of the system. The temperature of the TVSense region is then used as a proxy for the temperature of the network link. The routing mechanism uses this proxy temperature to monitor the network link temperature and make adjustments to the routing as described herein. All of the drivers may have TVSense regions 514 as shown or only subset of the drivers 510 could employ TVSense regions 514.

Figure 6:
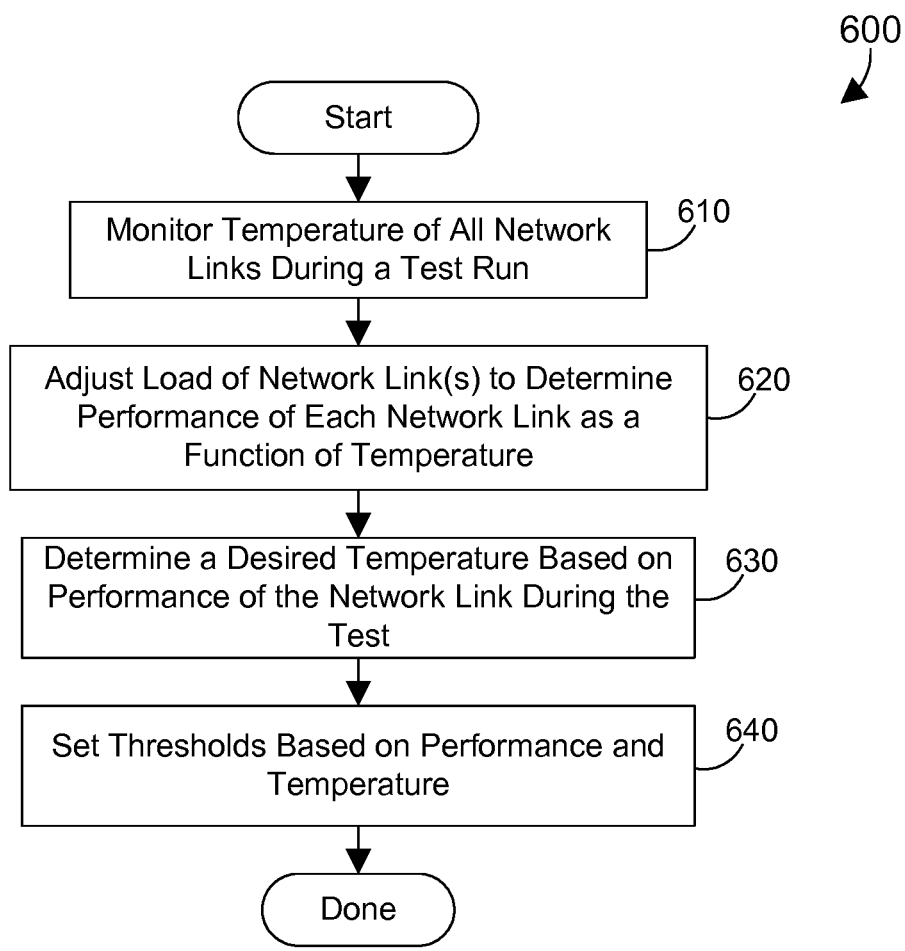
FIG. 6 is a flow diagram of a method for setting up threshold for routing data as described and claimed herein.

Referring now to FIG. 6, a flow diagram shows a method 600 for setting up thresholds for routing data as described and claimed herein. The method 600 is presented as a series of steps performed by a computer software program described above as a routing mechanism 314. First, monitor the temperature of the network links during a test run (step 610). Next, adjust the load of one or more network links to determine the performance of each link as a function of temperature (step 620). Determine a desired temperature based on the determined performance of the network link (step 630). Set thresholds based on performance and temperature, with a first threshold to re-route data traffic to another network link and a second threshold to throttle or disable data on the network link (step 640). The method is then done.

Figure 7:
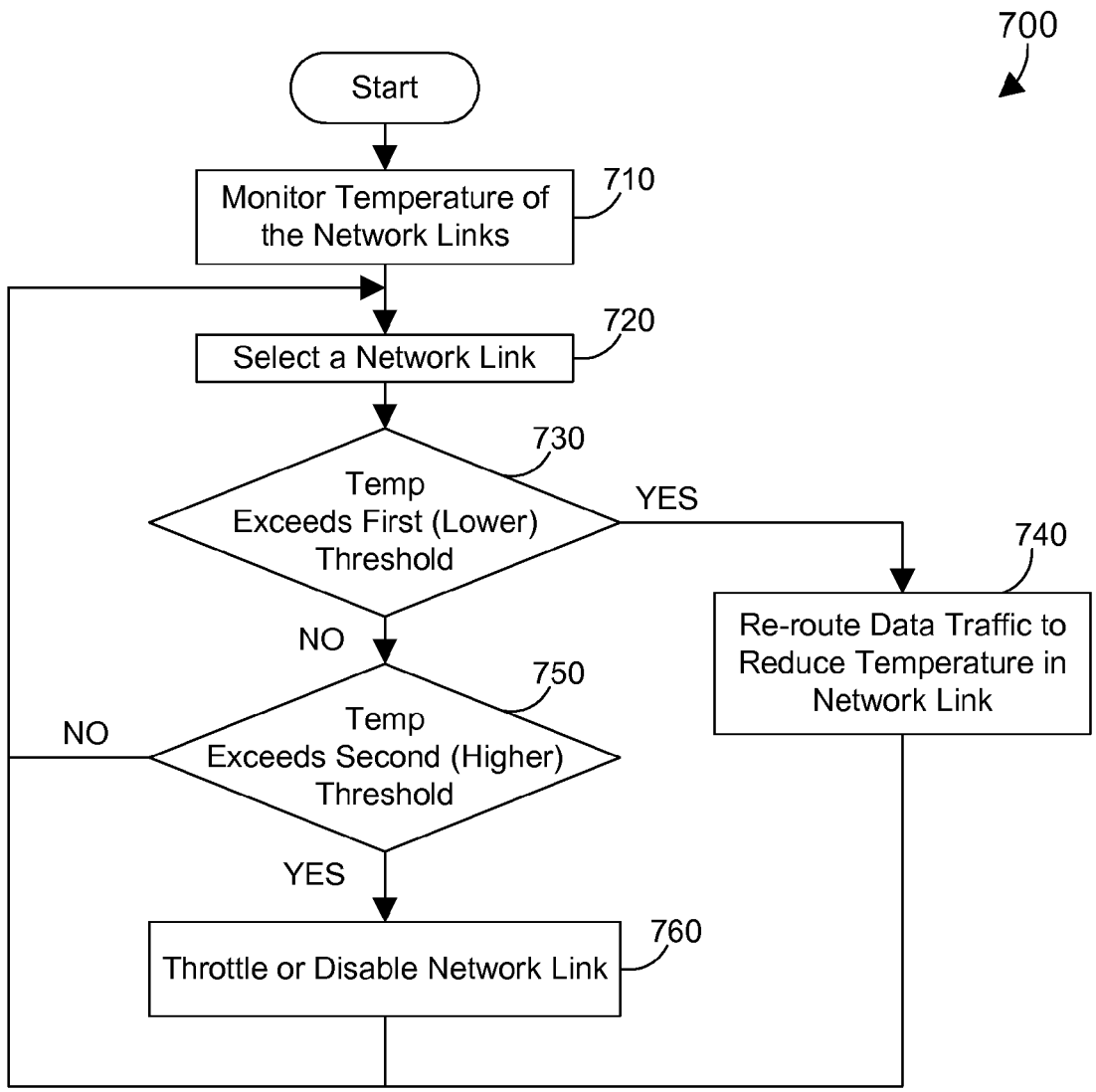
FIG. 7 is a flow diagram of a method for routing data as described and claimed herein.

FIG. 7 is a method flow diagram for routing data as described and claimed herein. The method 700 is presented as a series of steps performed by a computer software program described above as a routing mechanism 314. First, monitor the temperature of the network links (step 710). Next, select a network link to check the temperature (step 720). If the temperature of the network link exceeds a first threshold (step 730=yes), re-route data traffic to another network link to reduce temperature of the network link (step 740). If the temperature of the network link does not exceeds the first threshold (step 730=no), then determine if the temperature exceeds a second higher threshold (step 750). If the temperature exceeds the second threshold (step 750=yes) then throttle or disable the network link (step 760). If the temperature does not exceed the second threshold (step 750=no) then go back to step 720. The method repeats the monitoring of the network links.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. Java is a registered trademark of Oracle America, Inc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code could also be executed on a virtual machine in a cloud environment.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment. In addition, the service could be divided among various different service providers. For example, multiple providers of mobile data networks could each provide different pieces of the mobile data network disclosed herein that cooperate together to provide the functions disclosed herein.

The disclosure and claims are directed to a system and method for providing an apparatus and method to allocated data into partitioned database tables divided into data allocation containers (DACs) where data is placed into the DACs based on usage of the data in past queries to improve performance while accessing the data in a partitioned database.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for routing data over network links based on temperature of the network links comprising:
monitoring the temperature of a plurality of network links during a test run to determine a first threshold temperature and second threshold temperature based on performance of the network link while sending data over the network link;
monitoring the temperature of the plurality of network links during operation by monitoring a plurality of regions on an integrated circuit wherein each of the plurality of regions comprises a line driver to drive one of the plurality of network links;
re-routing data traffic on the network link to a second network link to reduce the temperature of the network link when the temperature of the network link exceeds a first threshold;
throttling data traffic on the network link when the temperature of the network link exceeds a second threshold; and
wherein monitoring the temperature of a plurality of network links during a test run further comprises:
adjusting the network link load to determine performance of each network link as a function of temperature;
determining a desired temperature based on performance of the network link as a function of temperature; and
determining a first and second desired temperature threshold to maintain a desired temperature of the network link.

2. The method of claim 1 wherein the plurality of network links are links between a plurality of bridge elements connected to a plurality of compute nodes, wherein each bridge element comprises:
a network adapter on an integrated circuit connecting the bridge element over a network link to a second bridge element;
a temperature monitor block that monitors a temperature of the plurality of regions on the integrated circuit; and wherein the network adapter routes data received by the bridge element from a compute node to the second bridge element depending on a temperature of the line driver region.

3. The method of claim 2 wherein there are multiple network links directly from the bridge element to the second bridge element.

4. The method of claim 2 wherein the second bridge element communicates with a compute node remotely over an interne network.

5. The method of claim 1 wherein the network adapter re-routes network traffic through an alternate network link to use an indirect path through a third bridge element.

6. The method of claim 1 further comprising an interconnect network that connects the links for the plurality of bridge elements on a backplane connecting the plurality of compute nodes.

7. A method for routing data over network links based on temperature of the network links comprising:
monitoring the temperature of a plurality of network links during a test run to determine a first threshold temperature and second threshold temperature based on performance of the network link while sending data over the network link, wherein monitoring the temperature of the plurality of network links comprises monitoring a temperature for each of a plurality of regions on an integrated circuit where each of the plurality of regions comprises a line driver to drive one of the plurality of network links;
monitoring the temperature of the plurality of network links during operation and selecting a network link;
re-routing data traffic on the network link to a second network link to reduce the temperature of the network link when the temperature of the network link exceeds a first threshold;
throttling data traffic on the network link when the temperature of the network link exceeds a second threshold; and wherein monitoring the temperature of a plurality of network links during a test run further comprises:
adjusting the network link load to determine performance of each network link as a function of temperature;
determining a desired temperature based on performance of the network link as a function of temperature; and
determining a first and second desired temperature threshold to maintain a desired temperature of the network link.

8. The method of claim 7 wherein the plurality of network links are links between a plurality of bridge elements connected to a plurality of compute nodes, wherein each bridge element comprises:
a network adapter on an integrated circuit connecting the bridge element over a network link to a second bridge element;
a temperature monitor block that monitors a temperature of the plurality of regions on the integrated circuit; and
wherein the network adapter routes data received by the bridge element from a compute node to the second bridge element depending on the temperature of the region.

9. The method of claim 7 further comprising re-routing network traffic through an alternate network link to use an indirect path through a third bridge element.

10. The method of claim 7 further comprising an interconnect network that connects the links for the plurality of bridge elements on a backplane connecting the plurality of compute nodes.

11. The method of claim 10 wherein there are multiple network links directly from the bridge element to the second bridge element.

12. The method of claim 10 wherein the second bridge element communicates with a compute node remotely over an internet network.

* * * * *